United States Patent
Charlat

(10) Patent No.: US 6,869,705 B2
(45) Date of Patent: Mar. 22, 2005

(54) METHOD AND DEVICE FOR RECOVERING WATER FROM A FUEL CELL

(75) Inventor: Pierre Charlat, Lans en Vercors (FR)

(73) Assignee: L'Air Liquide - Societe Anonyme a Directoire et Conseil de Surveillance pour l'etude et l'exploitation des Procedes Georges Claude, Paris Cedex (FR)

(*) Notice: Subject to any disclaimer, the term of this patent is extended or adjusted under 35 U.S.C. 154(b) by 444 days.

(21) Appl. No.: 10/169,711

(22) PCT Filed: Oct. 24, 2001

(86) PCT No.: PCT/FR01/03302
§ 371 (c)(1),
(2), (4) Date: Jul. 9, 2002

(87) PCT Pub. No.: WO02/39531
PCT Pub. Date: May 16, 2002

(65) Prior Publication Data
US 2002/0192514 A1 Dec. 19, 2002

(30) Foreign Application Priority Data
Nov. 9, 2000 (FR) .............................. 00 14406

(51) Int. Cl.$^7$ .................. H01M 8/00; H01M 8/04; H01M 8/12; H01M 2/00; H01M 2/02
(52) U.S. Cl. .............. 429/13; 429/14; 429/25; 429/34
(58) Field of Search .................. 429/13, 14, 25, 429/34

(56) References Cited

U.S. PATENT DOCUMENTS 3,861,958 A * 1/1975 Cheron ..................... 429/14
4,968,566 A   11/1990 Lersch et al.
5,958,613 A * 9/1999 Hamada et al. ............ 429/26

* cited by examiner

Primary Examiner—Patrick Ryan
Assistant Examiner—Julian Mercado
(74) Attorney, Agent, or Firm—Young & Thompson

(57) ABSTRACT

A rectilinear collector into which open the outlets of the cells and which is provided with a pressure regulator, a removal tube extending rectilinearly within the collector and connected from the outside to a recovery vat into which it opens through an outlet located at a height h relative to its axis, at least one constriction presented by the tube and calibrated such that the residual pressure downstream of the pressure regulator will be greater than that of a column of water having a height corresponding to the height h.

9 Claims, 1 Drawing Sheet

METHOD AND DEVICE FOR RECOVERING WATER FROM A FUEL CELL

FIELD OF THE INVENTION

The present invention relates to the field of fuel cells and, more particularly, those of the air-oxygen and hydrogen type and it relates, more specifically, to the problem of recovering the water produced by the operation of the cell.

A fuel cell is generally formed by a series of cells each comprising a cathode compartment provided with an electrode and connected to a circuit for the supply of a combustion supporter, which is to say generally air, enriched or not in oxygen, or even pure oxygen. Each cell comprises a second so-called anode compartment containing an electrode which is separated from the first by a membrane for permeation and reaction by means of catalysts of the two electrodes. Such an anode compartment is connected to a fuel circuit generally hydrogen.

The inlets and outlets of the cathode and anode circuit are connected respectively to distribution tubing and to collectors which have the purpose, in the latter case, of evacuating the mixtures resulting from the operation of the different cells.

The mixtures from the cathode and anode collectors contain gases and water which should be removed, after storage and pumping, so as to reinject it into the moistening or cooling circuit to contribute to the suitable hydraulic balance.

The problem of storage and pumping as well as the reinjection of the water gives rise to a number of difficulties which relate essentially to the structure of a cell.

Thus, it is difficult to connect the collectors, which are generally located in the lower portion, to raised outlets because the flow of water would thus depend on the operation cycle of the cell and would be in danger of giving rise, either to large variations in the flow rate and pressure because of the presence of liquid plugs, or to immersion of the fuel cell when the gaseous flow rate is too low to entrain the liquid water.

Moreover, when the cell is installed or arranged in an installation whose seating may vary, the inclination given to the cell can be responsible for increased gas flow relative to the low point which constitutes the collector, such that the retention of water which results can thus be possible again for immersion of the cell.

To ensure suitable operation, it would thus be indispensable to arrange the installation such that the separation of the gaseous and liquid phases, as to the water, can take place above the level of the outlet of the collectors.

However, such a requirement gives rise to the problem of integration of the cell into a larger operating installation and, in any case, requires maintaining it horizontal or at most with a slight inclination of the cell, so as to avoid the phenomenon of immersion.

SUMMARY OF THE INVENTION

The object thus is to be able to overcome the above requirement so as to provide a greater possibility of adaptation of a fuel cell in an installation, without the variations of seating of this latter giving rise to risk of immersion of the cell and, on the contrary, the separation of water from the gaseous phases can take place under optimum conditions such that a complete recovery will be favorable to maintaining a suitable hydraulic balance.

To achieve the above objects, the process of recovering the water from the mixture delivered at the outlet of the cathode circuit and/or the anode circuit of a fuel cell comprised of n cells, consists in:

arranging in a rectilinear collector, assembling the outlets of the different cells, a straight removal tube having a prolongation which opens into a recovery vat with a height h above the axis of the tube, providing said tube with at least one calibrated constriction, causing the collector to open through a gaseous mixture outlet provided with a pressure regulator, adjusting said regulator such that the pressure in the collector, less the pressure drop due to at least one calibrated constriction, will be greater than at least the height of the load contained by the column of water corresponding to the height h.

The invention also has for its object a device for recovering water which is characterized in that it comprises:

a rectilinear collector into which open the outlets of the cells and which is provided with a pressure regulator located upstream of its outlet, a removal tube extending rectilinearly within the collector and provided with a prolongation connecting, outside the collector, to a recovery vat into which it opens through an outlet located at a height h above the axis of the tube, at least one constriction provided by the tube and calibrated such that the residual pressure in the tube and maintained by the pressure regulator will be greater than the height of the column before corresponding to the height of h.

BRIEF DESCRIPTION OF THE DRAWINGS

Various other characteristics will appear from the description given below with reference to the accompanying drawing, which shows, by way of non-limiting example, an embodiment of the form and process of the invention.

DETAILED DESCRIPTION OF THE INVENTION

Figure 1:
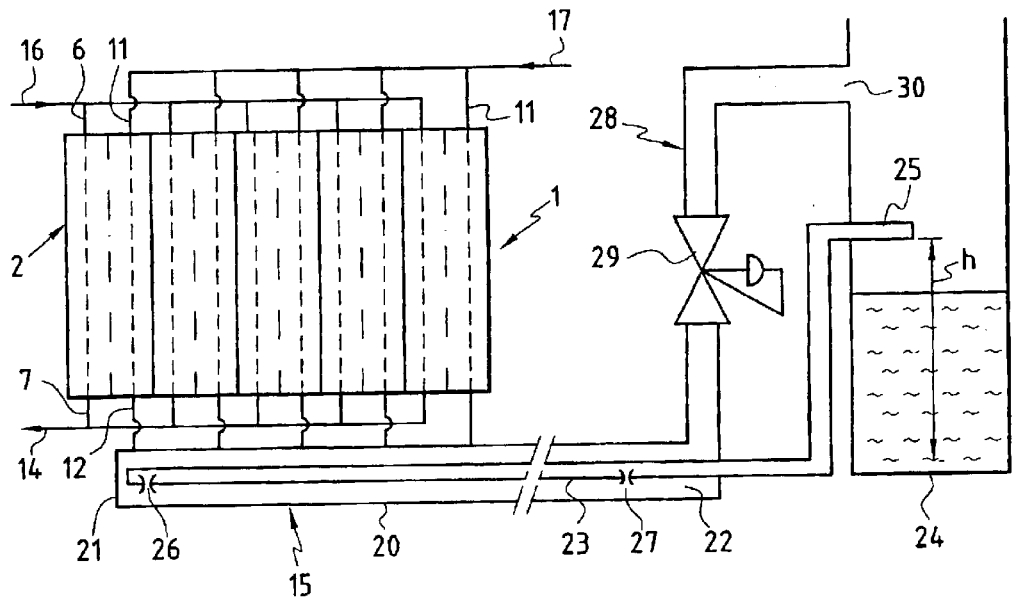
FIG. 1 is a schematic view showing the object of the invention.
Figure 2:
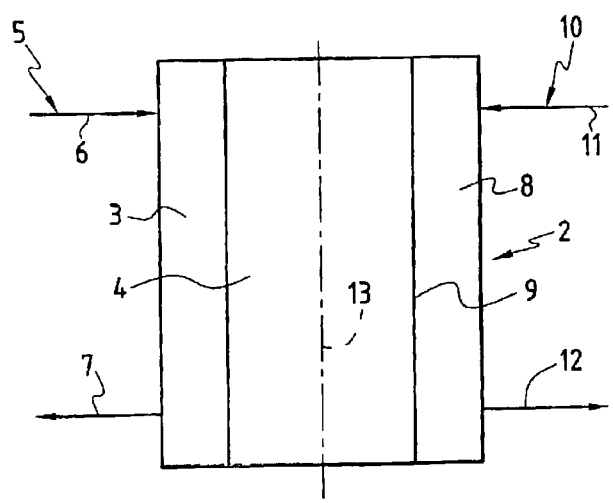
FIG. 2 is a schematic elevational view showing a constructional characteristic of a fuel cell.

FIG. 1 shows a fuel cell generally indicated by reference 1 and which is constituted by a series of n cells 2 of which each one is constructed as shown in FIG. 2.

Each cell 2 comprises a so-called "cathode" compartment 3 containing an electrode 4 which is connected to a circuit 5 comprising an input 6 and an output 7 and which is adapted to ensure the supply of the compartment 3 with a gaseous combustion supporter such as air, enriched or not in oxygen.

Cell 2 comprises a second so-called "anode" compartment 8 containing an electrode 9 and which is connected to a circuit 10 comprising an input branch 11 and an output branch 12. The circuit 10 is adapted to ensure the supply of the compartment 8 with a combustible fluid such as hydrogen.

The electrodes 4 and 9, provided with reaction catalysts, are separated by a permeation membrane 13.

The operation of each cell 2 produces reaction gas at the outlets 7 and 12 which, as is shown in FIG. 1, are connected by collectors 14 and 15 respectively whilst the inputs 6 and 11 are connected to distributors 16 and 17, respectively.

The operation of a fuel cell generates the production of water incorporated with the mixture at the outlets 7 and 12 and as a result collected by the collectors 14 and 15.

So as to offer a suitable possibility of recovering the liquid/water phase included in these mixtures, to permit the hydraulic balance and so that this recovery can take place without impeding the installation of the fuel cell nor limiting the possibilities of changing the seating of the installation in which such a cell is incorporated, there are provided means as shown in FIG. 1 only in relation to the outlet collector 15 of the combustible circuit 10, it follows that the object of the invention can be used for the collector 14, or even for collectors 14 and 15 simultaneously.

Each collector 14 or 15 comprises a tubular structure, generally rectilinear, which is closed at one end 21 but which is on the other hand open at the end 22 which is to ensure, by the means described hereafter, the evacuation of the gas phase. The collector 20 contains internally a removal tube 23 which is rectilinear and which passes through the end 22 sealingly to be connected to a water recovery vat 24, via a prolongation whose outlet 25 is raised relative to the axis of tube 23 by a height h.

The removal tube 23 comprises, substantially adjacent the ends 21 and 22, two calibrated constrictions 26 and 27 which are provided to introduce a pressure drop during removal of the water through the tube 23 from the mixture circulating within the collector 15.

The tube 20 has its open end 22 connected to an evacuation pipe 28 whose cross-section is controlled by a pressure regulator 29 of any suitable type. The adjustment of the regulator 29 is provided such that the pressure prevailing in the tube 20, less the pressure drop introduced by the constrictions 26 and 27, will leave a pressure which will be greater than that of the liquid column resulting from the height h to the outlet.

Thus, the water condensed in the tube 20 is caused to flow through one or the other of the constrictions 26 and 27 to be conveyed by the removal tube 23 to the pouring outlet 25 located above the normal level of the collection vat 24 from which the removal of recovered water is carried out to ensure reinjection into the hydraulic circuit for wetting and/or for cooling.

The structure might be arranged as shown in FIG. 1, such that the evacuation pipe opens through an outlet 30 within the vat 24 by being located above the outlet 25 of the removal tube 23.

The means used permit guaranteeing evacuation of condensed and recovered water, even if the cell is itself or with the installation in which it is incorporated, inclined to a more or less greater degree.

Thus, if the closed end 21 constitutes the low point, the removal of water takes place by calibrated constriction 26 without risk of immersion of the cell body.

If on the other hand the low point is located at the level of end 22, the accumulation in the pipe 28 upstream of the pressure regulator 29 promotes removal through the calibrated constriction 27, such that again the risk of immersion of the cell is eliminated.

In both cases, maintaining the pressure conditions referred to above promotes the evacuation through the outlet 25 of the water removed from within the collector.

By way of example, the pressure regulator 29 can be designed and adjusted such that a pressure of about 250 millibars prevails in the tube 20, whilst the calibrated constrictions 26 and 27 cause a pressure drop of the order of 50 millibar.

The invention is not limited to the examples described and shown, because various modifications can be given to it without departing from its scope.

What is claimed is:

1. Process for recovering the water included in the mixture delivered at the outlet of the cathode and/or anode circuit of a fuel cell comprised by n cells, which comprises:

providing in a rectilinear collector receiving output from the cells, a rectilinear removal tube having a prolongation which empties into a recovery vat at a height h above the axis of the tube, providing said tube with at least one calibrated constriction, causing the collector to empty through a gaseous mixture outlet provided with a pressure regulator, and adjusting said regulator such that the pressure in the collector less the pressure drop due to the at least one calibrated constriction, will be greater than at least the height of the load corresponding to the column of water having a water height h.

2. Process according to claim 1, which comprises causing the collector to empty into the receiving vat, at a level greater than that of the removal tube.

3. Process according to claim 2, which comprises closing one of the ends of the collector and providing the other end with a raised evacuation pipe whose rising branch has no regulator.

4. Process according to claim 3, which comprises providing two calibrated constrictions to be located adjacent two ends of the collector.

5. Device for recovering water included in the mixture delivered from the outlet of the cathode and/or anode circuit of a fuel cell comprised by n cells, which comprises:

a rectilinear collector (20) into which open the outlets (12) of the cells (2) and which is provided with a pressure regulator (29), a removal tube (23) extending rectilinearly within the collector, provided with a prolongation connecting it outside the collector to a recovery vat (24) into which it empties through an outlet (25) located at a height h above the axis of the tube, and at least one constriction (26 or 27) in the tube and calibrated such that the residual pressure controlled by the pressure regulator will be greater than the height of the column of water corresponding to the height h.

6. Device according to claim 5, wherein the outlet (25) of the removal tube is located above the normal level of the water in the recovery vat.

7. Device according to claim 5, wherein the collector empties into the recovery vat at a height greater than that of the removal tube.

8. Device according to claims 5, wherein the collector empties into the recovery vat through an evacuation pipe (28) whose rising branch is provided with the pressure regulator (29).

9. Device according to claims 5, wherein the removal tube comprises two calibrated constrictions provided to be located adjacent the ends of the collector.

* * * * *